United States Patent
Miyata

(10) Patent No.: US 8,253,976 B2
(45) Date of Patent: Aug. 28, 2012

(54) APPLY CONVERSION FORMULA TO FUNCTIONAL FILTERS EXECUTED IN SEQUENCE FOR MODIFYING PRINT JOB

(75) Inventor: Yuji Miyata, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1041 days.

(21) Appl. No.: 12/196,449

(22) Filed: Aug. 22, 2008

(65) Prior Publication Data

US 2009/0051954 A1 Feb. 26, 2009

(30) Foreign Application Priority Data

Aug. 24, 2007 (JP) ................. 2007-218100

(51) Int. Cl.
  *G06F 15/00* (2006.01)
  *G06F 3/12* (2006.01)
  *G06K 1/00* (2006.01)
  *G06K 15/02* (2006.01)
  *G06K 15/00* (2006.01)
(52) U.S. Cl. ....... 358/1.9; 358/1.11; 358/1.13; 358/1.18
(58) Field of Classification Search .................. None
  See application file for complete search history.

(56) References Cited

U.S. PATENT DOCUMENTS

| | | | |
|---|---|---|---|
| 6,707,568 B1 | 3/2004 | Yu | |
| 2004/0223167 A1 | 11/2004 | Yu | |
| 2005/0069224 A1* | 3/2005 | Nowicki et al. | ............... 382/298 |
| 2006/0028667 A1 | 2/2006 | Saito | |
| 2008/0297840 A1 | 12/2008 | Miyata | |

FOREIGN PATENT DOCUMENTS

| | | |
|---|---|---|
| JP | 2001-154821 | 6/2001 |
| JP | 2006-48537 | 2/2006 |
| JP | 2006-330854 | 12/2006 |
| JP | 2007-174387 | 7/2007 |
| JP | 2008-299507 | 12/2008 |

OTHER PUBLICATIONS

JP2007174387—translation.*

* cited by examiner

*Primary Examiner* — Fan Zhang

(74) *Attorney, Agent, or Firm* — Scully, Scott, Murphy & Presser, P.C.

(57) ABSTRACT

A print control device has a group of filters including at least two functional filters which execute a modifying process for modifying print job, a filter configuration storage that stores configuration information of the functional filter group, a filter execution unit which retrieves functional filters based on the filter configuration information and causes the retrieved functional filters to execute a modifying process of the print job data. The functional filter group includes a specific functional filter for modifying the print job data by adding additional information. The specific functional filter includes a conversion formula acquiring unit which acquires a conversion formula for converting the additional information corresponding to the modifying process executed by the other functional filters, and an additional information arranging unit for determining an arrangement of the additional information with respect to the print job modified by the other filters based on the conversion formula.

8 Claims, 13 Drawing Sheets

```
<Filters>
  <Filter>
    <DLL name>Scaling.DLL</DLL name>
  </Filter>
  <Filter>
    <DLL name>Watermark.DLL</DLL name>
  </Filter>
  <Filter>
    <DLL name>Offset.DLL</DLL name>
  </Filter>
  <Filter>
    <DLL name>Mirror.DLL</DLL name>
  </Filter>
  <Filter>
    <DLL name>RIP.DLL</DLL name>
  </Filter>
<Filters>
```

FIG. 5

$$\begin{pmatrix} a & 0 & 0 \\ 0 & a & 0 \\ 0 & 0 & 1 \end{pmatrix}$$

FIG.6A $$\begin{pmatrix} 1 & 0 & dx \\ 0 & 1 & dy \\ 0 & 0 & 1 \end{pmatrix}$$

FIG.6B $$\begin{pmatrix} 1 & 0 & W/2 \\ 0 & 1 & H/2 \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} 1 & 0 & -W/2 \\ 0 & 1 & -H/2 \\ 0 & 0 & 1 \end{pmatrix}$$

FIG.6C

BEFORE MODIFICATION

AFTER MODIFICATION

BEFORE MODIFICATION

AFTER MODIFICATION

BEFORE MODIFICATION

AFTER MODIFICATION

BEFORE MODIFICATION

AFTER MODIFICATION

| FUNCTIONAL FILTER | SET VALUE | APPLICATION TO WATERMARK |
|---|---|---|
| SCALING | 1.25 | TO APPLY |
| OFFSET | 100 IN X-DIRECTION | TO APPLY |
| ROTATION | 90 DEGREES | NOT TO APPLY |

FIG.15

| FUNCTIONAL FILTER | MATRIX | INVERSE MATRIX |
|---|---|---|
| SCALING | $\begin{pmatrix} 1.25 & 0 & 0 \\ 0 & 1.25 & 0 \\ 0 & 0 & 1 \end{pmatrix}$ | |
| OFFSET | $\begin{pmatrix} 1 & 0 & 100 \\ 0 & 1 & 0 \\ 0 & 0 & 1 \end{pmatrix}$ | $\begin{pmatrix} 1 & 0 & -100 \\ 0 & 1 & 0 \\ 0 & 0 & 1 \end{pmatrix}$ |
| ROTATION | $\begin{pmatrix} 0 & -1 & 5000 \\ 1 & 0 & 1000 \\ 0 & 0 & 1 \end{pmatrix}$ | $\begin{pmatrix} 0 & 1 & -1000 \\ -1 & 0 & 5000 \\ 0 & 0 & 1 \end{pmatrix}$ |

FIG.16

| FUNCTIONAL FILTER | SET VALUE | APPLICATION TO WATERMARK |
|---|---|---|
| SCALING | 0.8 | TO APPLY |
| OFFSET | -200 IN Y-DIRECTION | NOT TO APPLY |
| ROTATION | 45 DEGREES | NOT TO APPLY |

FIG.17

| FUNCTIONAL FILTER | MATRIX | INVERSE MATRIX |
|---|---|---|
| SCALING | $\begin{pmatrix} 0.8 & 0 & 0 \\ 0 & 0.8 & 0 \\ 0 & 0 & 1 \end{pmatrix}$ | |
| OFFSET | $\begin{pmatrix} 1 & 0 & 0 \\ 0 & 1 & -200 \\ 0 & 0 & 1 \end{pmatrix}$ | $\begin{pmatrix} 1 & 0 & 0 \\ 0 & 1 & 200 \\ 0 & 0 & 1 \end{pmatrix}$ |
| ROTATION | $\begin{pmatrix} 0.707 & -0.707 & 2707 \\ 0.707 & 0.707 & -536 \\ 0 & 0 & 1 \end{pmatrix}$ | $\begin{pmatrix} 0.707 & 0.707 & -1536 \\ -0.707 & 0.707 & -2293 \\ 0 & 0 & 1 \end{pmatrix}$ |

FIG.18

APPLY CONVERSION FORMULA TO FUNCTIONAL FILTERS EXECUTED IN SEQUENCE FOR MODIFYING PRINT JOB

CROSS-REFERENCE TO RELATED APPLICATION

This application claims priority under 35 U.S.C. §119 from Japanese Patent Application No. 2007-218100 filed on Aug. 24, 2007. The entire subject matter of the application is incorporated herein by reference.

BACKGROUND

1. Technical Field

The present invention relates to a print control device and a recording medium storing a printer driver. Specifically, the invention relates to the print control device configured to modify print job data with use of functional filters, and the recording medium containing a printer driver to be installed in the print control device and to cause the print control device to function.

2. Prior Art

Generally, in the print control device for controlling a printer, a printer driver, which is a program, having functions of modifying the print job data is installed. As the functions of modifying the print job data, there are known a sorting function for changing the order of images to be printed, a multi-page function for printing a plurality of pages of images on a sheet of a recording paper, a watermark function for printing an image with additional images such as see-through letters and the like as the watermark.

Typically, the printer driver which is configured to modify document data output in an XML (Extensible Markup Language) format from an application is provided with program modules which execute various modifying processes as functional filters. The functional filters can be added to and removed from the printer driver. The printer driver retrieves the functional filters when it executes a print job, and modifies the document data using the functional filters, and output the modified print job as print data, which is transmitted to the printer or the like.

Regarding the printer driver making use of the functional filters, a print system allowing a user to change the order of execution of the functional filters is disclosed in Japanese Patent Provisional Publication No. 2006-48537 (hereinafter, referred to as '537 publication). In such a print system, depending on the combination of various functions, and depending of the order of the various functions, different images may be output.

For example, an output image based on the print data, which is modified in accordance with a multi-page function (e.g., 2-in-1 function) and the watermark function in this order, and another output image based on the print data, which is modified in accordance with the watermark function and the multi-page function in this order, are different. According to the print system disclosed in '537 publication, therefore, he user is allowed to designate the order of the functional filters so that the user can obtain desired images.

SUMMARY OF THE INVENTION

However, the conventional printer driver as described above has a problem as follows. The order of execution of the functional filters to be executed may be different depending on the users. However, the order of execution of the functional filters is preliminarily defined for each printer driver. Therefore, if a certain user changes the order of execution of the functional filters and does not restore the order, another user may obtain unexpected print result due to the changed order of execution of the functional filters.

Further, typically, an administrator privilege is required to modify a file in which the order of execution of the functional filters has been set. That is, a normal user is not allowed to change the order of execution of the functional filters. The normal user need to obtain the administrator privilege if he/she intends to change the execution order.

The embodiments described blow are intended to solve the above-described problem of the conventional printer driver. That is, according to the embodiments, an improved printer driver is provided, with which the users can modify the execution order of the functional filters as desired individually, and the modification does not affect another user's usage of the printer driver.

According to an aspect of the invention, there is provided a print control device, which is provided with a group of filters including at least two functional filters configured to executing a modifying process for modifying print job, a filter configuration storage that stores configuration information of the functional filter group, a filter execution unit configured to retrieve functional filters based on the filter configuration information stored in the filter configuration storage and cause the retrieved functional filters to execute a modifying process of the print job data. The functional filter group includes a specific functional filter that is configured to modify the print job data by adding additional information to the print job data. Further, the specific functional filter is provided with a conversion formula acquiring unit configured to inquire other filters to acquire a conversion formula for converting the additional information corresponding to the modifying process executed by the other functional filters, and an additional information arranging unit configured to determine an arrangement of the additional information with respect to the print job modified by the other filters based on the conversion formula acquired by the conversion formula acquiring unit.

According to a further aspect of the invention, there is provided a computer-readable recording medium containing a printer driver which is a program including instructions to cause a computer, when executed thereby, to function as a print control device as described above.

With the above configurations, the user is allowed to execute a desired modifying process of a print job without affecting the print job of another user.

BRIEF DESCRIPTION OF THE ACCOMPANYING DRAWINGS

FIG. 5 shows an example of an XML file storing filter information.

FIGS. 6A-6C show examples of a matrix stored in a formula storage.

FIG. 15 shows a first example of settings for creating the position adjustment matrix.

FIG. 16 shows coordinate conversion matrixes obtained by the first example for creating the position adjustment matrix.

FIG. 17 shows a second example of settings for creating the position adjustment matrix.

FIG. 18 shows coordinate conversion matrixes obtained by the first second for creating the position adjustment matrix.

DETAILED DESCRIPTION OF THE EMBODIMENT

Hereinafter, referring to the accompanying drawings, embodiments of the present invention will be described in detail. Specifically, in the following description, a personal computer installed with a printer driver, to which the invention is applied, will be described.

Configuration of Print System

Figure 1:
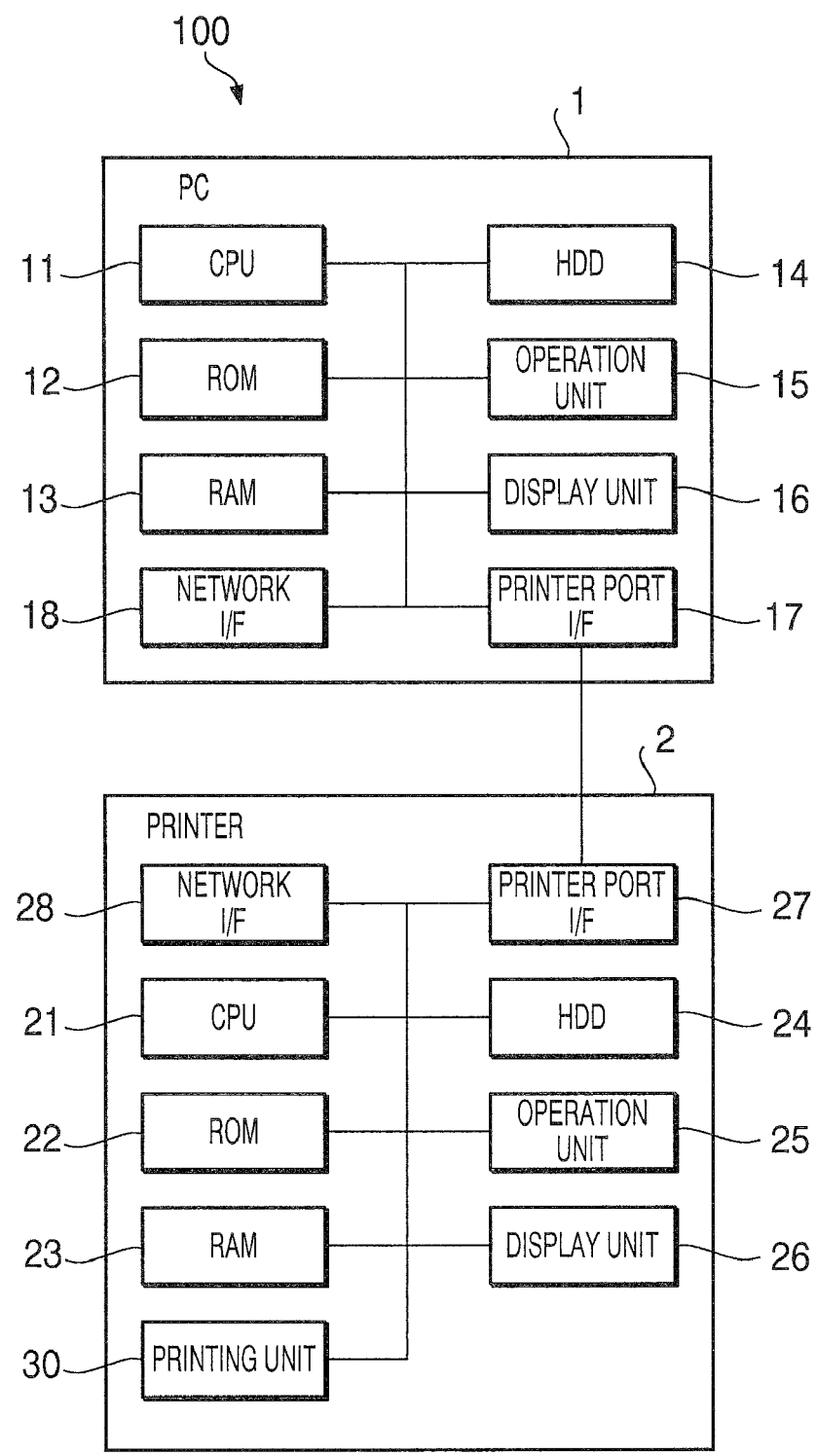
FIG. 1 is a block diagram showing a configuration of a print system according to an embodiment.

FIG. 1 is a block diagram of a print system 100 according to an embodiment of the invention. As shown in FIG. 1, the print system 100 includes a printer 2 (which is an example of an image forming device) and a PC personal computer) 1 (which is an example of an information terminal device). According to the embodiment, the PC 1 and the printer 2 are connected via a USB (Universal Serial Bus) cable. In FIG. 1, only one PC 1 and one printer 2 are shown for brevity. However, the invention need not be limited the configuration shown in FIG. 1, and a plurality of PCs 1 and/or a plurality of printers 1 could be employed in the print system 100. Further, the connection between the PC 1 and the printer 2 need not be limited to the USB connection, but any other suitable connection using, for example, a serial communication cable, a parallel communication cable, a wired LAN cable and a wireless communication path such as a wireless LAN may be alternatively or optionally employed.

The PC 1 includes a CPU (Central Processing Unit) 11, a ROM (Read Only Memory) 12 storing programs such as a BIOS to be executed by the CPU 11 during a boot process, a RAM (Random Access Memory) 13 which may be used as a temporary storage for storing data when the CPU 11 executes various processes, and an HDD (Hard Disk Drive) 14 for storing various programs and various pieces of data.

The PC 1 further includes an operation unit 15 provided with a keyboard and a mouse, a display unit 16 provided with an LCD (Liquid Crystal Display), a printer port interface 17 (which includes a USB interface in this embodiment), and a network interface 18 which exchanges signals with an external device via a network such as the Internet.

The HDD 14 stores an OS (Operating System), various applications capable of editing image data for printing (e.g., document creating software, drawing/painting software, spreadsheet software and the like), and a printer driver for transmitting print data described in a PDL (Page Descriptive Language) format to the printer 2.

The printer 2 includes a CPU 21 for executing various processes, a ROM 22 storing various programs to be executed during the boot process, a RAM 23 for temporarily storing various data when the CPU 21 executes various processes, and an HDD 24 for storing various programs and various pieces of data.

The printer 2 further includes an operation unit 25, which is arranged on an outer surface of a casing of the printer 2. The operation unit 25 is provided with a plurality of operation buttons. The printer 2 further includes a display unit 26 arranged on the outer surface of the casing of the printer 2 and provided with an LCD. Further, the printer 2 includes a printer port interface 27 (which is a USB interface, according to the embodiment) for exchanging signals with the PC 1, and a network interface 28 for exchanging signals with an external device via a network (e.g., the LAN, the Internet and the like).

The printer 2 further includes a printing unit 30 for forming (printing) images on recording sheets (e.g., recording paper, OHP sheets, etc.). The printing unit 30 may be ones employing an electrophotographic imaging method, an inkjet printing method, or any other generally-known image forming method. Further, in view of the application of the invention, the imaging unit 30 may be configured to form color images or only monochromatic images.

With the above configuration, a user may operate the PC 1, and creates/edits a document, charts, spreadsheet, and image data such as photo data and the like, using the applications installed in the PC 1. Then, the user may transmit the PDL-format pint data to the printer 2, which prints out the images represented by the print data.

At least some of the applications installed in the PC 1 have a printing function. With this printing function, print job data such as document data and/or image data is transmitted to the printer driver. The printer driver generates print data, which is necessary for printing the document data and/or image data with the printer 2, based on the print job data transmitted from the applications.

The print data generated by the printer driver is transmitted to the printer 2 via the printer port interface 17. The printer 2 (the CPU 21) drives the printing unit 30 when it receives the print data. The printing unit 30 prints the image on the recording sheets selected by the user in accordance with the print data.

Configuration of the Printer Driver

Next, a printer driver 4 installed in the PC 1 will be described. The printer driver 4 for the printer 2 has a plurality of software modules (in the form of DLL in the embodiment) for executing various data modifications as functional filters. The functional filters may be added, deleted and/or functionally enhanced by executing version-up process or by incorporating add-ins.

Figure 2:
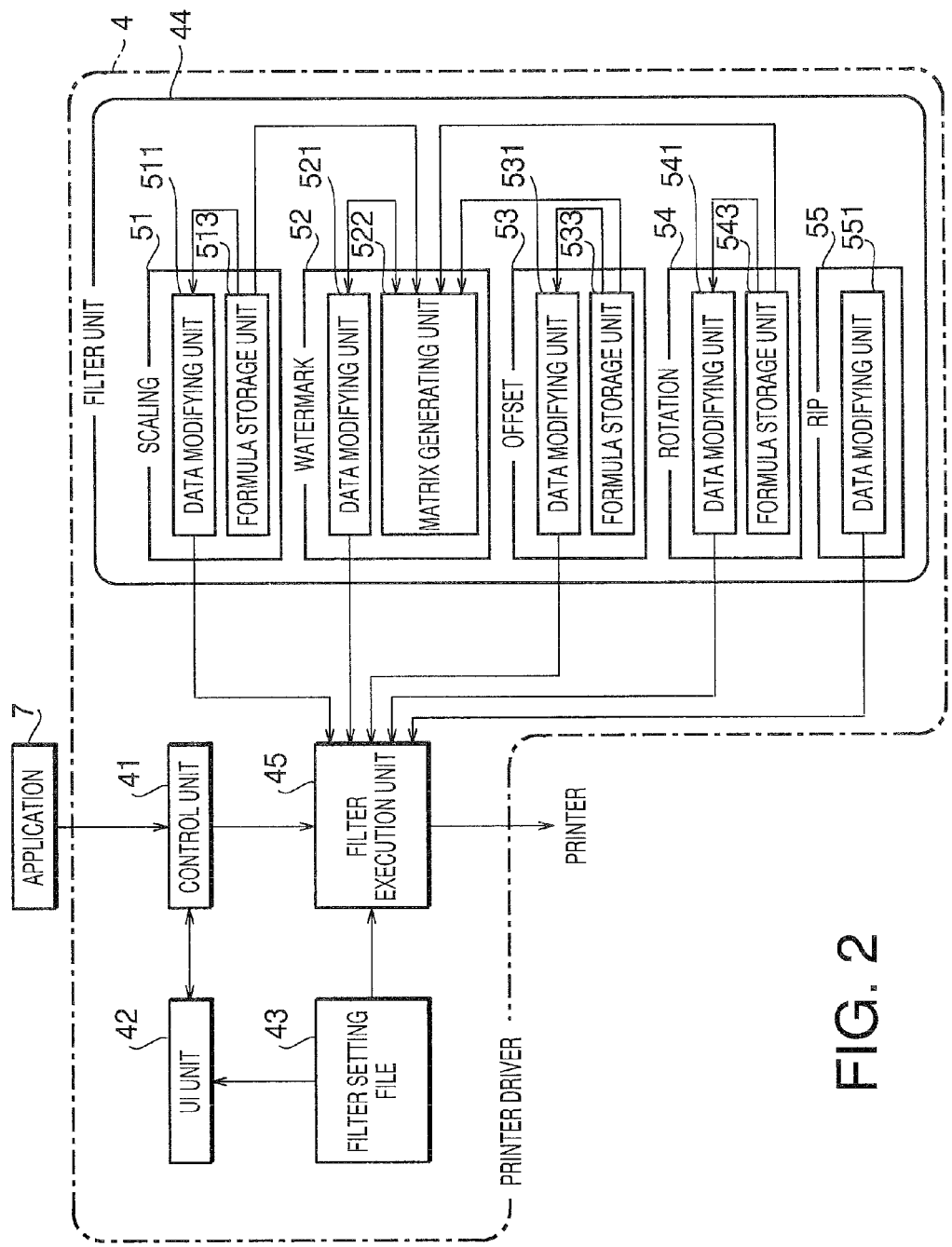
FIG. 2 is a block diagram showing a functional configuration of a printer driver according to the embodiment of the invention.

FIG. 2 shows a functional configuration of the printer driver 4 according to present invention. As shown in FIG. 2, the printer driver 4 has a control unit 41, a user interface (UI) unit 42, a filter setting file 43, a filter unit 44 and a filter execution unit 45.

The control unit 41 is configured to receive a request from the applications and return (transmit) information to the application when necessary. Specifically, according to the embodiment, the printer driver 4 receives the print job data from the application 7. In addition, the printer driver 4 receives an instruction to display the functions available to the printer driver 4 itself. Practically, the print job data output from the application 7 is accumulated by a spooler, and then transmitted to the printer driver 4 in order. In the description of the embodiment, the spooler will not described for brevity.

Figure 3:
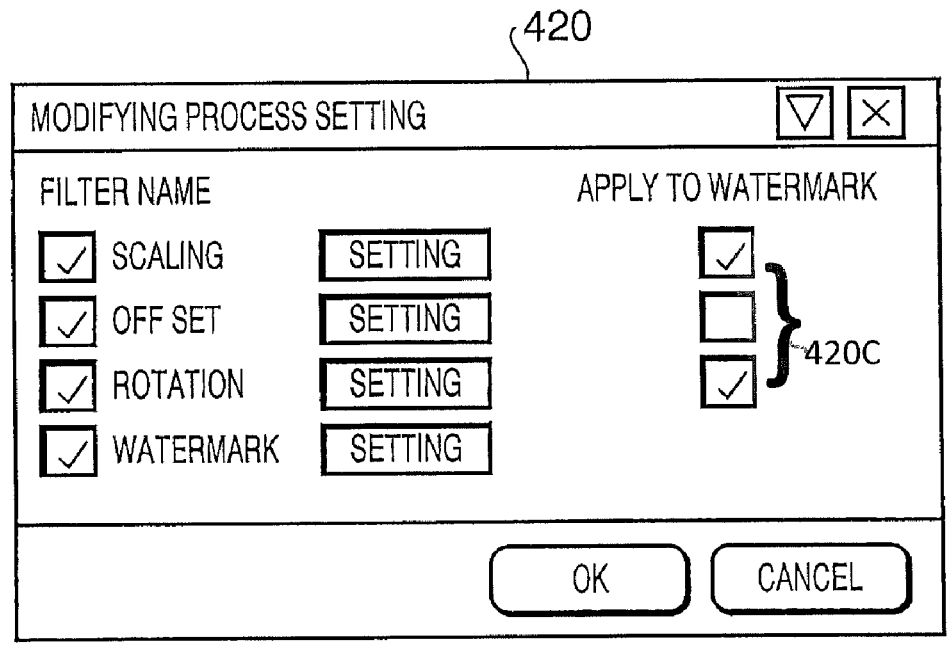
FIG. 3 shows an example of a dialogue for setting a modifying process which is displayed on a UI unit.

The UI unit 42 has a function of providing a user interface for allowing a user to set various modifying processes. For example, according to the printer driver 4, the UI unit 42 displays a modifying process setting dialogue 420 as shown in FIG. 3. In the modifying process setting dialogue 420, a list 420L of functional filters (excluding the RIP) available in the printer driver 4 is displayed. Further, buttons 420B for opening setting dialogues for setting parameters of the functional filters, respectively. The list 420L of the functional filters is acquired from the setting file 43, which will be described later.

Figure 4:
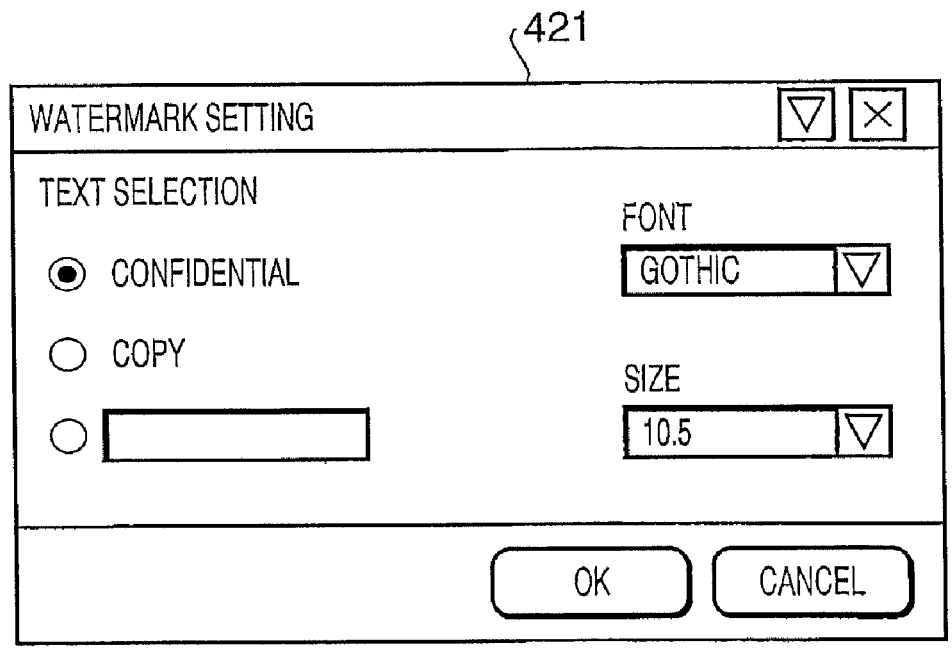
FIG. 4 shows an example of a dialogue for a detailed setting of watermark displayed on the UI unit.

For example, when a setting of the watermark is executed, a watermark setting dialogue 421 as shown in FIG. 4 is displayed. A user can set a character string, a type and a size of the font to be used through the watermark setting dialogue 421. The watermark setting dialogue 421 is retrieved from the functional filter for watermark, which is registered with the filter setting file 43.

In the modifying process setting dialogue 420, check boxes 420C for setting/unsetting modifying processes of the functional filters other than the watermark are displayed as shown in FIG. 3. The modifying processes for adding additional information to the print job data (e.g., watermark), a position of the additional information is affected by the modification applied by another functional filter which applies coordinate-conversion (e.g., scaling, offset and rotation applied by the functional filters 51, 53 and 54). For example, print data in which the coordinate-conversion for scaling has been applied to the watermark (i.e., the scaling is also applied to the watermark) and print data in which the coordinate-conversion for scaling has not been applied to the watermark, the images to be output are different. Therefore, the user is required to select whether the modifying process of each of the functional filters 51, 53 and 54 is applied to the watermark.

Specifically, in the filter setting file 43, a type and a link to a resource are stored for each functional filter. That is, according to the embodiment, the functional filters of "scaling," "watermark," "offset," "rotation" and "RIP" are indicated together with the program module names thereof respectively. The order of the list of the functional filters in the filter configuration in FIG. 5 represents the order of execution thereof. That is, according to the example shown in FIG. 5, the printer driver 4 executes the functional filters of "scaling," "watermark," "offset," "rotation" and "RIP" in this order. It should be noted that the configuration information of the functional filters may be stored in the HTML format, CSV format or the like, instead of the XML format.

In FIG. 2, a filter unit 44 represents a library group of functional filters 51-55 the printer driver 4 has. In the embodiment, the functional filters 51-55 are provided as DLLs, which are retrieved and reside in the memory when used, respectively.

Specifically, according to the embodiment, the functional filter 51 is a "scaling filer" for magnifying/reducing an image at a predetermined magnification/reduction ratio; the function filter 52 is the "watermark filter" for adding a see-through text; the functional filter 53 is the "offset filter" for moving the image and/or adjusting margins; the functional filter 54 is the "rotation filter" for applying the horizontal flip and vertical flip of the image; and the functional filter 55 is the "RIP" filter for developing the print job data into a bitmap, and converting the same into the PLD data.

The functional filters 51-55 are provided with data modifying units 511, 521, 531, 541 and 551, which modify data based on the functions thereof, respectively. Further, each of the functions filters 51, 53 and 54 (excluding the functional filter 52 for the watermark and the functional filter 55 for the RIP) stores a formula for executing the coordinate conversion.

Specifically, in the functional filter 51 for scaling uses a matrix (see FIG. 6A) which is defined for magnification/reduction. In FIG. 6A, "a" denotes the magnification/reduction ratio. For that purpose, the functional filter 51 is provided with a formula storage unit 513 for storing the formula defined for the magnification/reduction change. Similarly, the functional filter 53 for offset is provided with a formula storage 533 storing a formula defined for the offset process (see FIG. 6B). In FIG. 6B, dx denotes the offset in X direction and dy denotes the offset in Y direction. The functional filter 54 for rotation is provided with a formula storage 543 for storing a formula defined for the rotation process (see FIG. 6C). In FIG. 6C, represents a rotation angle, W represents a width of the recording sheet, and H represents the height of the recording sheet.

In the functional filter 52 for the watermark, there is provided a matrix generating unit 522 which generates a matrix for determining a position to which a watermark is applied. For generating the matrix, formula defined by another functional filter are used. That is, the matrix generating unit 522 inquires the formula storing unit of another functional filter, when the modifying process is executed, in accordance with a setting whether the modifying process of another functional filter is to be reflected in arranging the watermark. The setting whether the modifying process is to be reflected in the arrangement of the watermark is set through a dialogue the UI unit 42 provides. A process for generating matrixes based on the acquired matrix will be described later.

The filter execution unit 45 has a function of modifying the document data in accordance with the print job data. When the modifying process is executed, the functional filters 51-55 are retrieved in accordance with the contents of the filter setting file 43 and reside in the memory, and the modifying process is executed in accordance with the setting of the modifying process designated by the print job data. When the modifying process has been applied, the print data is developed into bitmap data via the RIP filter and transmitted to the printer 2.

Operation of Printer Driver
<Print Process>

Next, the print process which is executed when the printer driver 4 receives the print job data will be described. According to the print process executed by the printer driver 4, the filter execution unit 45 mainly retrieves the functional filters the printer driver 4 owns into the memory, and the modifying process is applied to the print job data, which is then transmitted to the printer 2. The order of execution of the functional filters is the order in which they are registered with the filter setting file 43, and the order is fixed.

Figure 7:
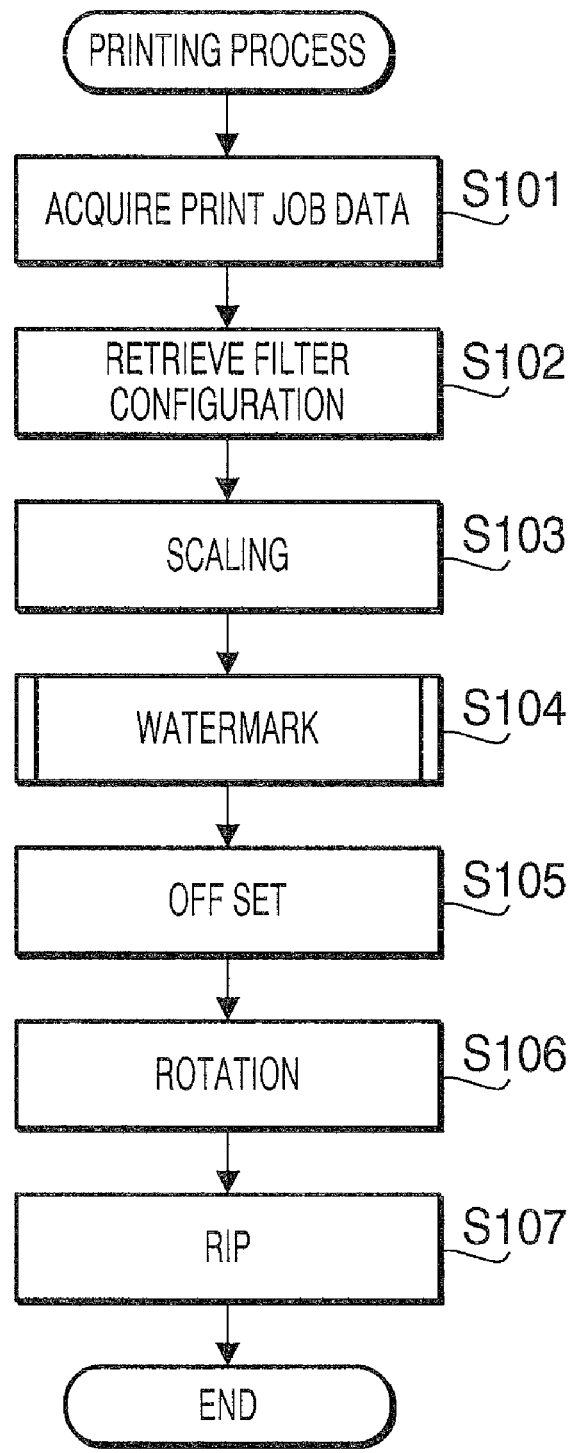
FIG. 7 is a flowchart illustrating a print process according to the embodiment of the invention.

Next, the print process executed by the filter execution unit 45 of the printer driver 4 will be described referring to a flowchart shown in FIG. 7.

First, the process acquires the print job data from the application 7 via the control unit 41 (S101). Setting information for various modifying processes are attached to the print job data as well as the document data subject to be printed. Next, the process retrieves the filter setting file 43 (S102). The process acquires the order of execution of the functional filters, and the reference (i.e., a link to the resource) of each functional filter. It should be noted that the order of execution of steps S101 and S102 may be reversed.

Figure 8A:
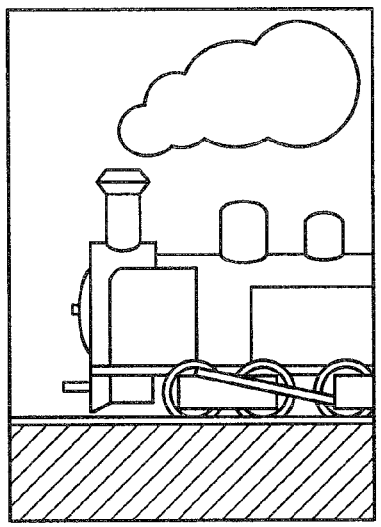
FIGS. 8A and 8B show images before and after a scaling process is applied.
Figure 8B:
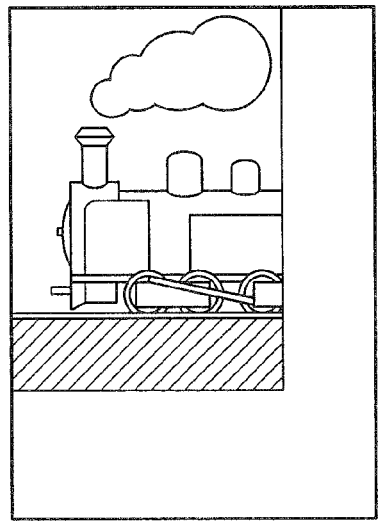

Next, the process retrieves the functional filter in the order of registration with the filter setting file 43 (i.e., one by one from the top), and executes the modifying process. According to the embodiment, firstly the functional filter 51 for scaling, which is registered firstly is retrieved, and the scaling process is executed (S103). Specifically, the process inserts a scaling command in each page of the document data in accordance with the setting of the scaling. For example, if the magnification/reduction ratio is 0.75, the document data is reduced when printed as shown in FIG. 8.

Figure 9A:
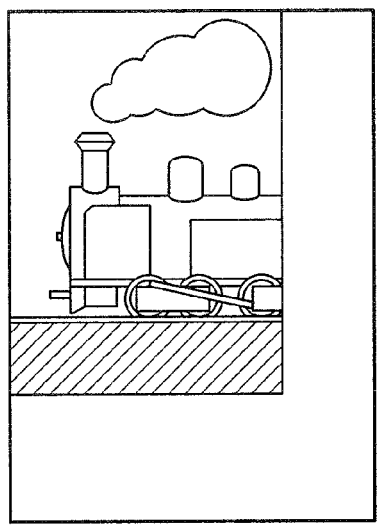
FIGS. 9A and 9B show images before and after a watermark process is executed.
Figure 9B:
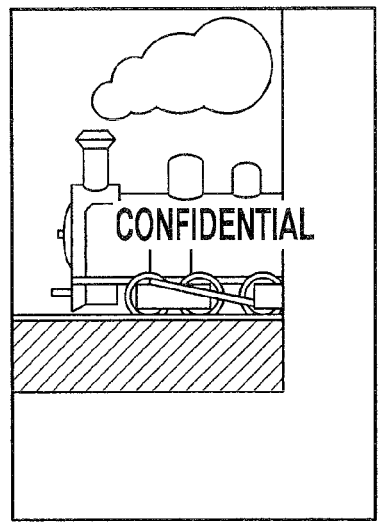

Next, the process retrieves the functional filter 52 for the watermark, which is registered next to the functional filter 51, and executes the watermark process (S104). When, for example, the watermark process is for inserting a character string "CONFIDENTIAL" as a watermark, the character string is inserted in the document data when printed as shown in FIG. 9. The watermark process will be described in detail later.

Figure 10A:
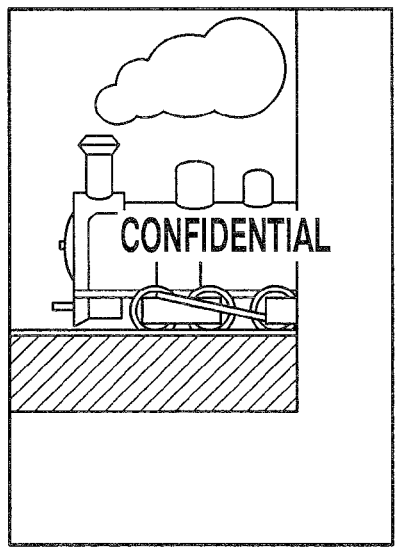
FIGS. 10A and 10B show images before and after an offset process is executed.
Figure 10B:
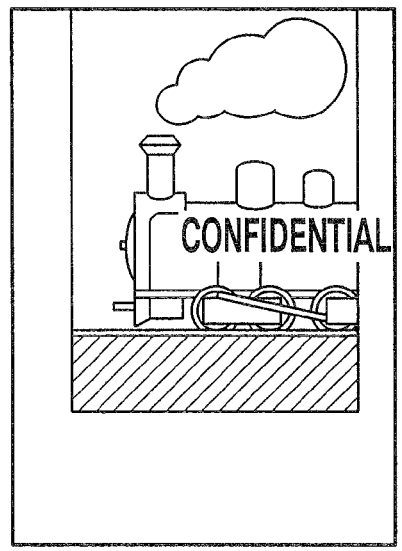

Next, the process retrieves the functional filter 53 for an area offset, which is registered next to the functional filter 52, and executes the offset process (S105). That is, the process inserts a command for the area offset in each page of the document data in accordance with the offset setting. For example, if the 2 cm of offset for generating left binding margin, the document data for each page is shifted rightward (or leftward for the data to be printed on a rear surface) by 2 cm when printed, as shown in FIG. 10.

Figure 11A:
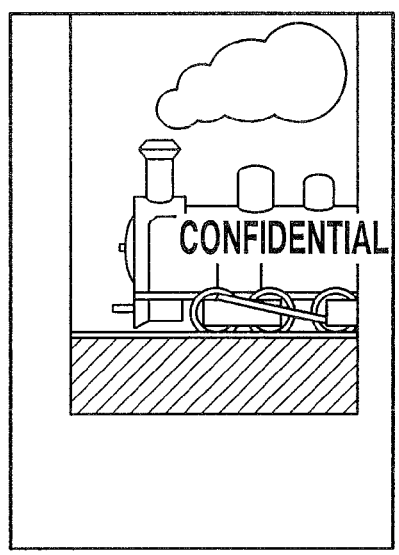
FIGS. 11A and 11B show images before and after a rotation process is executed.
Figure 11B:
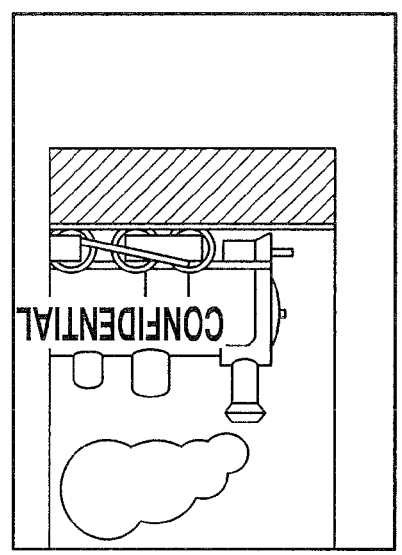

Next, the process retrieves the functional filter 54 for rotation, which is registered next to the functional filter 53, and executes the rotation process (S106). That is, the process inserts a command for rotation in each page of the document data in accordance with the setting for rotation. For example, if the 180-degree rotation is set, each page of the document data is rotated by 180 degrees, when printed, as shown in FIG. 11.

Lastly, the process retrieves the functional filter 55 for RIP, which is registered next to the functional filter 54, and executes a process of generating PDL data (S107). In the process of generating the PDL data, the process converts the document data of the XML format data into bitmap format data, applies a color conversion, binalization, compression and the like, and further the process adds a PJL (Printer Job Language).

<Watermark Process (S104)>

Figure 12:
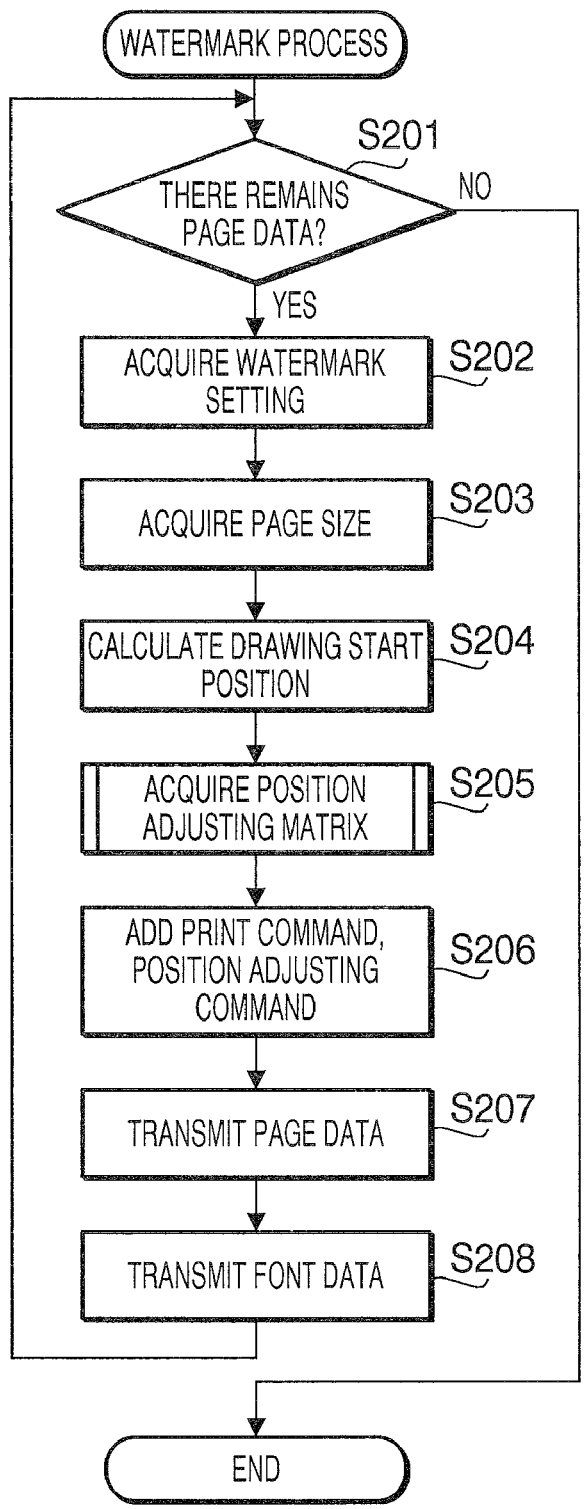
FIG. 12 shows a flowchart illustrating the watermark process.

FIG. 12 shows a flowchart of the watermark process, which is executed by the functional filter 52.

First, the process (functional filter 52) judges whether there remains page data to be processed (S201). If there is no page data remained (S201: NO), the process is finished. If there remains page data (S201: YES), the process proceeds to S202.

In S202, the process acquires the setting of watermark from the print job data (S202). The setting of watermark includes, for example, character strings such as "CONFIDENTIAL" or "COPY," a type of font of the character string, the size of the character string and the like. In the example shown in FIG. 9, the character string is "CONFIDENTIAL" and the font is Gothic.

Next, the process acquires the page size from the page data (S203). In the following example, it is assumed that the page size is set such that the width is 4000 dots and the height is 6000 dots. Thereafter, the process calculates an initial position of the watermark based on the page size (S204). If the size of the character string of the watermark is set such that the width is 2000 dots and the height is 600 dots, a starting position of the watermark is $1000^{th}$ dots vertically, and $2700^{th}$ dots horizontally, for example.

Next, the process acquires a matrix used for adjusting the position of the watermark (S205). As described above, the position of the watermark differs depending on whether it is adjusted in accordance with the modifying processes executed by the other functional filters. In S205, the process acquires the matrix for determining a final position of the watermark. A process for generating the matrix will be described in detail later.

In S206, the process adds a command for drawing the watermark and a command for adjusting the position of the watermark at the end of the page data. Then, the process transmits the page data to the printer (S207). Thereafter, the process transmits the font data to be used for drawing the watermark (S208). After S208, the process returns to S201 and judges whether there remains page data to be processed.

Process of Acquiring Position Adjusting Matrix

Figure 13:
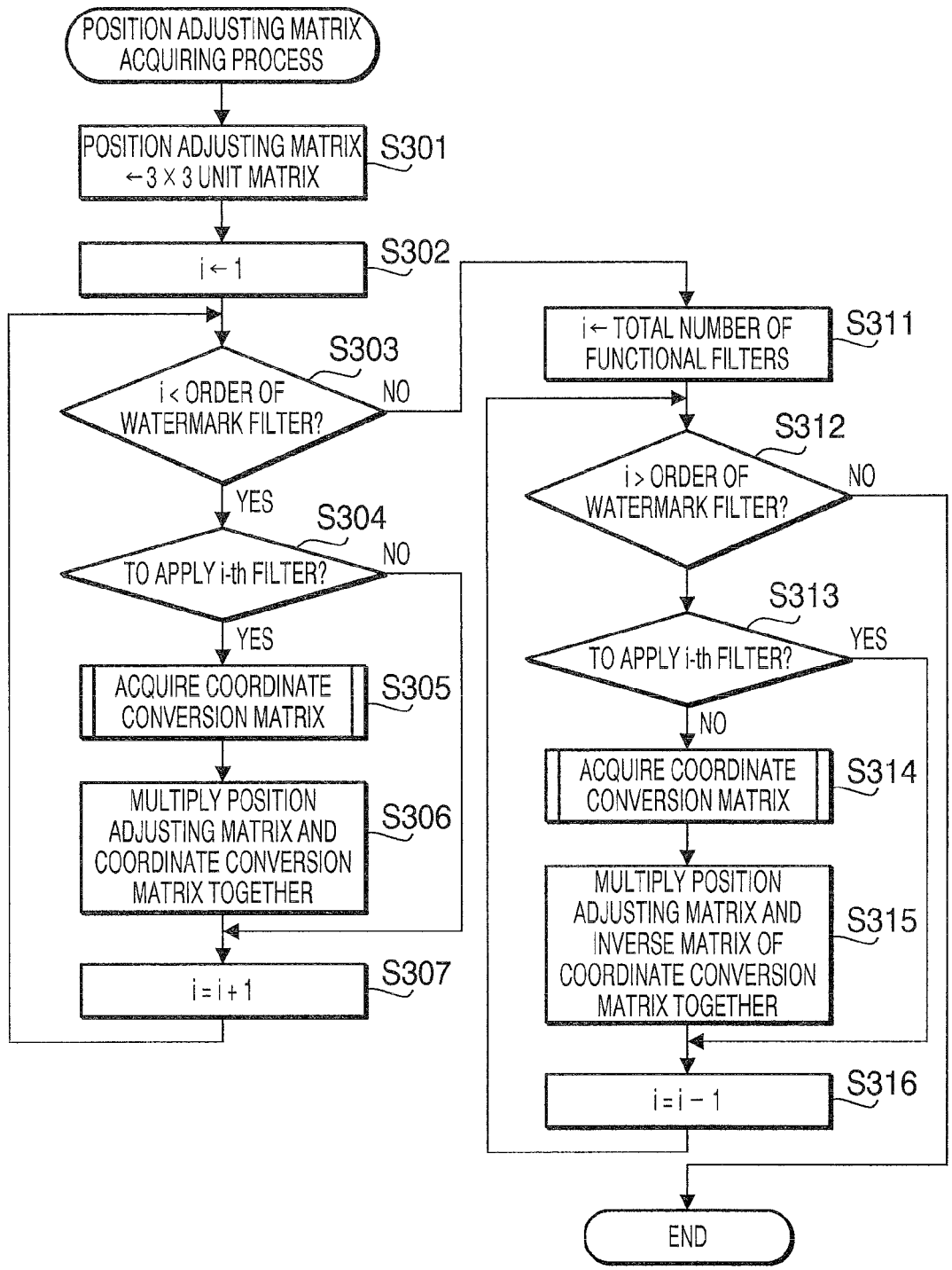
FIG. 13 shows a flowchart illustrating a position adjustment matrix acquiring process.

FIG. 13 shows a flowchart illustrating a position adjusting matrix acquiring process, which is executed by the matrix generating unit 522 of the functional filter 52.

When the process shown in FIG. 13 starts, the process substitutes 3 by 3 unit matrix for the position adjusting matrix (S301) and sets a variable i to 1 (one) as the initial value.

Next, the process judges whether the variable i is less than the execution order of the watermark (S303). If the variable i is less than the execution order of the watermark (S303: YES), the process proceeds to S304. In S304, the process examines the functional filters which are executed before the execution of the watermark. If the variable i is not less than the execution order (S303: NO), the process proceeds to S311. In S311, the process examines the functional filters to be executed after the watermark.

In step S304, the process judges whether the modifying process of the i-th functional filter is to be applied to the watermark based on the print setting (S304). In the following steps, in order to apply the modifying process to the watermark, a coordinate conversion of the i-th functional filter is applied to the watermark.

If the modifying process is applied to the watermark (S304: YES), the process requests the i-th functional filter to acquire a coordinate conversion matrix corresponding to the i-th functional filter (S305). The procedure of acquiring the coordinate conversion matrix will be described later. In S306, the process multiplies a position adjusting matrix and the coordinate conversion matrix together. That is, the position adjusting matrix is multiplied by the coordinate conversion matrixes subsequently in accordance with the order of execution.

Thereafter, the process adds one (1) to the variable i (S307), returns to S303 and repeats the steps S303 onwards. If the coordinate conversion is not executed (S304: NO), the process skips the steps S304 and S305, and moves to S307.

According to this embodiment, the watermark process is executed secondly. Therefore, the functional filter executed before the watermark is the functional filter 51 for scaling. In order to acquire the position adjusting matrix, a matrix generating unit 522 of the functional unit 52 requests a formula storage unit 513 of the functional filter 51 for a matrix which is generated based on a formula stored in the formula storage unit 513.

Regarding the functional filters which are executed after the watermark filter, the process firstly sets the total number of the functional filters to the variable i (S311). According to the present embodiment, the total number of the functional filters in the filter unit 44 is four, and thus "four" is set to the variable i.

Next, the process judges whether the variable i is greater than the execution order of the watermark (S312). If the variable i is greater than the execution order of the watermark (S312: YES), the process moves to S313, and investigates the functional filters to be executed after the functional filter of the watermark. If the variable i is less than the execution order (S312: NO), the process is terminated.

In S313, the process judges whether the modifying process of the i-th functional filter is to be applied to the watermark based on the print setting. If the modifying process is not to be applied to the watermark, the coordinate conversion of the i-th functional filter is applied to the watermark.

If the modifying process is not applied to the watermark (S313: NO), the process transmits an inquire to the i-th functional filter and acquires the coordinate conversion matrix of the i-th functional filter (S314). A procedure of acquiring the coordinate conversion matrix will be described later. According to the embodiment, the execution order of the filter of the watermark, which is followed by the functional filters 53 and 54 for offset and rotation, respectively. Therefore, when the position adjusting matrix is to be acquired, the matrix generating unit 522 inquires the formula storages 533 and 543, and acquires a matrix which is generated based on the formula stored in the formula storages 533 and 534.

Then, the process multiplies the inverse matrix of the obtained coordinate conversion matrix and the position adjusting matrix together (S315). That is, the inverse matrixes are multiplied with the position adjusting matrix in the order from a lately executed functional filter to an early executed functional filter.

Thereafter, the process subtract one from the variable i (S316), returns to S312 and executes the steps S312 onwards. It should be noted that, if the coordinate conversion is executed (S313: YES), the process skips the steps S314 and S315 and moves to S316.

With respect to the functional filters which are executed before the watermark process, since the watermark process is executed after the functional filters have been done, the coordinate conversion process by the functional filters cannot be applied to the watermark. Therefore, if the coordinate conversion is to be applied to the watermark, the process obtains the coordinate conversion matrix of the functional filter and multiplies the same to the positional adjusting matrix of the watermark. On the other hand, regarding the functional filters executed after the watermark process, the coordinate conversion process of the functional filter can be applied to the watermark. Therefore, if the coordinate conversion process is not to be applied to the watermark, the coordinate positions having been converted by the functional filters is to be restored. That is, the process obtains the coordinate conversion matrix of the functional filter and multiplies the inverse matrix thereof with the position adjusting matrix.

<Coordinate Conversion Matrix Acquiring Process (S305, S314)>

Figure 14:
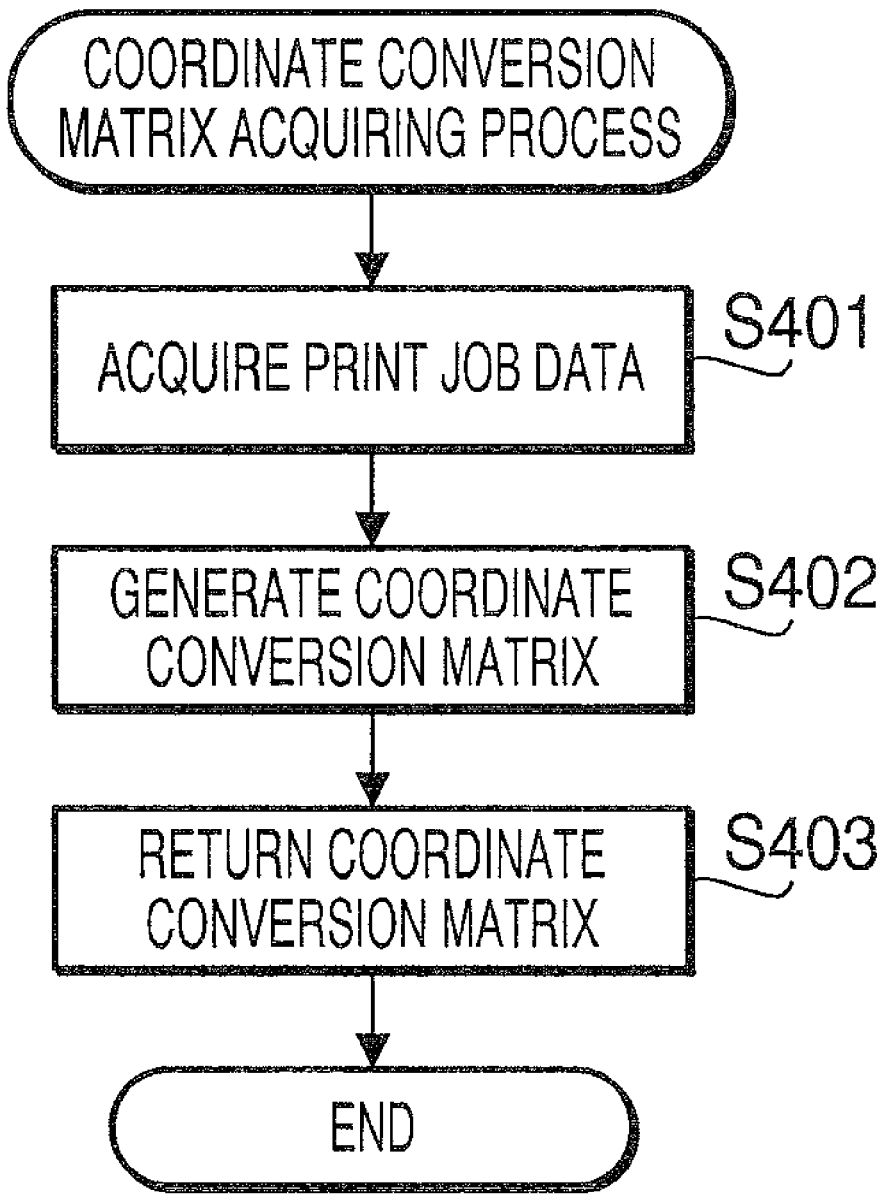
FIG. 14 shows a flowchart illustrating a coordinate conversion matrix acquiring process.

Next, a coordinate conversion matrix acquiring process will be described with reference to a flowchart shown in FIG. 14. This process is executed by the formula storage units 513, 533 and 543 of the functional filters 51, 53 and 54, which is not the functional filter 52 for the watermark.

Firstly, the process acquires the print job data (S401). Then, the process acquires setting of modifying processes included in the print job, and generates a coordinate conversion matrix based on the setting (S402). The coordinate conversion matrix is generated in different ways depending on the functional filter.

According to the embodiment, the coordinate conversion matrixes for the functional filters 51, 53 and 54 are generated based on the definition of the formula shown in FIGS. 6A-6C. The thus generated coordinate conversion matrixes are transmitted to the matrix generating unit 522 of the functional filter 52 for the watermark (S403).

Concrete Example 1

FIG. 15 shows a concrete example 1. In this concrete example 1, it is assumed that scaling (magnification) is 1.25, an offset is 100 dots in an X direction, and a rotation is 90 degrees. Further, the scaling and the offset are to be applied to the watermark, whereas the rotation is not.

With the above setting, a matrix as shown in FIG. 16 is obtained from the functional filters 51, 53 and 54. Among them, the offset and rotation are the functional filters executed after the watermark, the inverse matrix of the acquired matrix is used. In this case, the position adjusting matrix is expressed as follows (see formula 1).

$$\begin{pmatrix} 0 & 1 & -1000 \\ -1 & 0 & 5000 \\ 0 & 0 & 1 \end{pmatrix} \begin{pmatrix} 1.25 & 0 & 0 \\ 0 & 1.25 & 0 \\ 0 & 0 & 1 \end{pmatrix} = \begin{pmatrix} 0 & 1.25 & -1000 \\ -1.25 & 0 & 5000 \\ 0 & 0 & 1 \end{pmatrix} \quad (1)$$

That is, a matrix obtained from the functional filter 51 for scaling which is to be applied to the watermark is multiplied with an inverse matrix of a matrix obtained from the functional filter 54 for rotation which is not to be applied to the watermark to obtain the position adjusting matrix for the watermark.

Concrete Example 2

FIG. 2 shows a concrete example 2. In this example, it is assumed that the scaling (magnification) is 0.8, the offset is −200 dots in the Y direction, and the rotation is 45 degrees. The scaling is to be applied to the watermark, whereas the offset and rotation are not to be applied to the watermark.

With the above setting, a matrix as shown in FIG. 18 is obtained from the functional filters 51, 53 and 54. Among the functional filters, ones for the offset and the rotation are the functional filters executed after the watermark. Therefore, for these functional filters, inverse matrixes are used, In this example, the position adjusting matrix is expressed as follows (formula 2).

$$\begin{pmatrix} 1 & 0 & 0 \\ 0 & 1 & 200 \\ 0 & 0 & 1 \end{pmatrix} \begin{pmatrix} 0.707 & 0.707 & -1356 \\ -0.707 & 0.707 & -2293 \\ 0 & 0 & 1 \end{pmatrix} \begin{pmatrix} 0.8 & 0 & 0 \\ 0 & 0.8 & 0 \\ 0 & 0 & 1 \end{pmatrix} = \quad (2)$$

$$\begin{pmatrix} 0.566 & 0.566 & -1536 \\ -0.566 & 0.566 & -2093 \\ 0 & 0 & 1 \end{pmatrix}$$

That is, a matrix obtained from the functional filter 51 for scaling which is to be applied to the watermark is multiplied with an inverse matrix of the matrix obtained from the functional filter 54 for rotation which is not to be applied to the watermark to obtain the position adjusting matrix for the watermark.

As above, according to the printer driver 4, with the UI unit 42, the user selects whether the watermark is subjected to the other modifying processes. That is, the user can select, for each functional filter.

With the above setting, the watermark is arranged at a user-intended position. Further, whether the coordinate conversion is to be applied or not can be set for each of the functional filters. Therefore, freedom in arranging the watermark is high.

The printer driver 4 is configured such that the filter execution unit 45 retrieves each functional filter and executes the modifying process corresponding to the retrieved functional filter.

The functional filter 52 for watermark obtains the matrixes for the modifying process from the functional filters 51, 53 and 54, which are not the functional filters for watermark, in accordance with the information representing whether the coordinate conversion is to be applied, which information being attached to the print job data.

Then, based on the obtained matrix, the arrangement of the watermark is determined. That is, the process firstly reflects the coordinate conversion information of the functional filters other than that of the watermark, then determines the position at which the watermark is added.

With this configuration, the user can arranged the watermark at the desired position without changing the order of execution of the functional filters, that is, without modifying the filter setting file 43.

Further, since the filter setting file 43 is not modified, right of administrator is unnecessary for changing the order of execution and there is no influence to other users. That is, the print control device, or printer driver which allows the user to execute the desired modifying processes individually.

It should be appreciated that the above-described embodiment is only an exemplarily one, and the invention need not be limited to the configuration described above. The above-described configuration can be modified in various ways without departing from the scope of the invention. For example, the image forming device need not be limited to the printer, and could be a copier, facsimile machine or a multi-function device having an image forming function. Further, the print control device need not be limited to the PC, and could be a workstation, a portable information terminal device or the like.

According to the exemplary embodiment described above, the functional filter for watermark is described for explaining the configuration to apply or not apply the functional filters, the invention need not be limited to this configuration. For example, the invention could be applied to the functional filter for header/footer.

What is claim is:

1. A print control device, comprising:
   a group of filters including at least two functional filters configured to execute a modifying process for modifying print job;
   a filter configuration storage that stores configuration information of the functional filter group;
   a filter execution unit configured to retrieve functional filters based on the filter configuration information stored in the filter configuration storage and cause the retrieved functional filters to execute a modifying process of the print job data;
   wherein the functional filter group includes a specific functional filter that is configured to modify the print job data by adding additional information to the print job data,
   wherein the specific functional filter is provided with:
      an execution order acquiring unit configured to inquire the filter configuration storing unit to acquire an execution order of the specific functional filter itself;
   a conversion formula acquiring unit configured to inquire other filters to acquire a conversion formula for converting the additional information corresponding to the modifying process executed by the other functional filters, the conversion formula including matrixes defined for the functional filters of the group of filters, respectively; and
   an additional information arranging unit configured to determine an arrangement of the additional information with respect to the print job modified by the other filters based on the conversion formula acquired by the conversion formula acquiring unit, and the additional information arranging unit is further configured to calculate, based upon the execution order, a position of the additional information with respect to the print job data modified by the other filters by multiplying inverse matrixes corresponding to the functional filters executed before the specific filter is executed and matrixes corresponding to the functional filters executed after the specific filter is executed.

2. The print control device according to claim 1, further comprising a selection unit allowing a user to select whether each of the modifying processes executed by the other filters are to be applied to the modifying process executed by the specific functional filter.

3. The print control device according to claim 1,
   wherein the additional information arranging unit extracts a matrix of a functional filter if the functional filter has been executed before the specific functional filter and the modifying process of the functional filter is set to be applied to the modifying process of the specific functional filter,
   wherein the additional information arranging unit extracts an inverse matrix of a functional filter if the functional filter has been executed after the specific functional filter and the modifying process of the functional filter is set to be applied to the modifying process of the specific functional filter.

4. The print control device according to claim 1,
   wherein the specific functional filter is a functional filter configured to add a watermark to the print job data.

5. A non-transitory computer-readable recording medium containing a printer driver which is a program including instructions to cause a computer, when executed thereby, to function as a print control device including:
   a group of filters including at least two functional filters configured to execute a modifying process for modifying print job;
   a filter configuration storage that stores configuration information of the functional filter group;
   a filter execution unit configured to retrieve functional filters based on the filter configuration information stored in the filter configuration storage and cause the retrieved functional filters to execute a modifying process of the print job data;
   wherein the functional filter group includes a specific functional filter that is configured to modify the print job data by adding additional information to the print job data,
   wherein the specific functional filter is provided with:
   an execution order acquiring unit configured to inquire the filter configuration storing unit to acquire an execution order of the specific functional filter itself;
   a conversion formula acquiring unit configured to inquire other filters to acquire a conversion formula for converting the additional information corresponding to the modifying process executed by the other functional filters, the conversion formula including matrixes defined for the functional filters of the group of filters, respectively; and
   an additional information arranging unit configured to determine an arrangement of the additional information with respect to the print job modified by the other filters based on the conversion formula acquired by the conversion formula acquiring unit and the additional information arranging unit is further configured to calculate, based upon the execution order, a position of the additional information with respect to the print job data modified by the other filters by multiplying inverse matrixes corresponding to the functional filters executed before the specific filter is executed and matrixes corresponding to the functional filters executed after the specific filter is executed.

6. The recording medium according to claim 5, wherein the instructions cause the computer such that the print control device further comprising a selection unit allowing a user to select whether each of the modifying processes executed by the other filters are to be applied to the modifying process executed by the specific functional filter.

7. The recording medium according to claim 5,
wherein the additional information arranging unit extracts a matrix of a functional filter if the functional filter has been executed before the specific functional filter and the modifying process of the functional filter is set to be applied to the modifying process of the specific functional filter, wherein the additional information arranging unit extracts an inverse matrix of a functional filter if the functional filter has been executed after the specific functional filter and the modifying process of the functional filter is set to be applied to the modifying process of the specific functional filter.

8. The recording medium according to claim 5, wherein the specific functional filter is a functional filter configured to add a watermark to the print job data.

* * * * *